United States Patent
Dignard

(10) Patent No.: US 10,956,136 B2
(45) Date of Patent: Mar. 23, 2021

(54) USER INTERFACE RESOURCE FILE OPTIMIZATION

(71) Applicant: eBay, Inc., San Jose, CA (US)

(72) Inventor: Ryan Dignard, Oakland, CA (US)

(73) Assignee: eBay, Inc., San Jose, CA (US)

(*) Notice: Subject to any disclaimer, the term of this patent is extended or adjusted under 35 U.S.C. 154(b) by 73 days.

(21) Appl. No.: 16/162,313

(22) Filed: Oct. 16, 2018

(65) Prior Publication Data

US 2020/0117432 A1   Apr. 16, 2020

(51) Int. Cl.
  *G06F 9/44* (2018.01)
  *G06F 8/41* (2018.01)
  *G06F 8/38* (2018.01)

(52) U.S. Cl.
  CPC ............. *G06F 8/443* (2013.01); *G06F 8/38* (2013.01); *G06F 8/433* (2013.01)

(58) Field of Classification Search
  CPC ........................................................ G06F 9/44
  See application file for complete search history.

(56) References Cited

U.S. PATENT DOCUMENTS

| 5,295,065 | A | * | 3/1994 | Chapman | ......... G05B 19/41865 700/99 |
| 5,790,778 | A | | 8/1998 | Bush et al. | |
| 5,790,853 | A | * | 8/1998 | Nomura | .................. G06F 9/451 718/104 |
| 5,815,720 | A | | 9/1998 | Buzbee | |
| 6,182,284 | B1 | * | 1/2001 | Sreedhar | ................. G06F 8/433 717/146 |
| 6,298,440 | B1 | * | 10/2001 | Siegel | ................. G06F 9/44521 713/1 |

(Continued)

FOREIGN PATENT DOCUMENTS

| CN | 106708565 A | 5/2017 |
| WO | 2013/081666 A1 | 6/2013 |
| WO | 2020/081134 A1 | 4/2020 |

OTHER PUBLICATIONS

Invitation to Pay Additional Fee received for PCT Patent Application No. PCT/US2019/042003, dated Sep. 13, 2019, 2 pages.

(Continued)

*Primary Examiner* — Jae U Jeon
(74) *Attorney, Agent, or Firm* — Fig. 1 Patents

(57) ABSTRACT

Technologies described herein reduce the size of a software application. In some embodiments, the size of one or more resource files of an application are reduced. Resource files include key/value pairs that define elements of the application. In some embodiments, the application's source code is analyzed to determine if an entry in a resource file may be removed. For instance, initialization functions in the application's source code may be analyzed to determine if a value loaded from a resource file is replaced before being used. For example, a button with a color property may be defined as grey by a resource, but later set to orange in an initialization function. In this case, the resource entry defining the button as grey is superfluous and may be safely removed. This technique allows for entries to be removed from a resource file even though the source code references the entries.

20 Claims, 10 Drawing Sheets

(56) References Cited

U.S. PATENT DOCUMENTS

| | | | |
|---|---|---|---|
| 6,658,573 B1* | 12/2003 | Bischof | G06F 9/54 |
| | | | 707/999.009 |
| 7,017,143 B1 | 3/2006 | Andrew et al. | |
| 7,353,503 B2 | 4/2008 | Nair et al. | |
| 7,574,695 B2* | 8/2009 | Chander | G06F 9/44589 |
| | | | 717/126 |
| 7,574,895 B2* | 8/2009 | Schnell | G01N 15/0656 |
| | | | 73/28.01 |
| 7,996,850 B2 | 8/2011 | Massmann et al. | |
| 8,671,389 B1 | 3/2014 | Buryak et al. | |
| 2002/0145765 A1* | 10/2002 | Chou | H04N 1/333 |
| | | | 358/474 |
| 2005/0278689 A1* | 12/2005 | Gong | G06F 9/5083 |
| | | | 717/103 |
| 2006/0130021 A1 | 6/2006 | Plum et al. | |
| 2007/0259672 A1* | 11/2007 | Heo | H04W 72/042 |
| | | | 455/452.2 |
| 2008/0016314 A1 | 1/2008 | Li et al. | |
| 2008/0021917 A1* | 1/2008 | Baker | H04L 41/08 |
| 2008/0072211 A1 | 3/2008 | Rothman et al. | |
| 2012/0192174 A1* | 7/2012 | Tsuboi | G06F 8/61 |
| | | | 717/176 |
| 2012/0317556 A1 | 12/2012 | Zhu et al. | |
| 2015/0363237 A1* | 12/2015 | Finnie | G06F 9/5016 |
| | | | 718/104 |
| 2017/0322690 A1* | 11/2017 | Chen | G06F 16/288 |

OTHER PUBLICATIONS

Github, "Reduce Size of Nib-files," Retrieve from the Internet URL: https://github.com/matsmattsson/nibsqueeze, Accessed on Dec. 24, 2019, 1 page.

International Search Report received for U.S. Patent Application No. PCT/US2019/042003, dated Dec. 20, 2019, 5 pages.

International Written Opinion received for Patent Application No. PCT/US2019/042003, dated Dec. 20, 2019, 3 pages.

Sweeney, et al., "A Study of Dead Data Members in C++ Applications", Proceeding PLDI '98 1.3-5 Proceedings of the ACM SIGPLAN 1998 conference on Programming language design and implementation, Jun. 17-19, 1998, pp. 324-332.

Github, "Reduce Size of Nib-files", Retrieve from the Internet: <https://github.com/matsmattsson/nibsqueeze>, 1 page.

Invitation to Pay Additional Fee, Where Applicable, Protest fee Received for PCT Patent Application No. PCT/US2019/042003, dated Sep. 13, 2019, 2 pages.

* cited by examiner

Resource File 110

0: NSObject
   UNLibTopLevelObjectsKey = @41
   UNLibObjectsKey = @3
1: NSString
   NS.bytes = IBFilesOwner
2: NSImage
   NSInlinedValue = true
   NS.bytes = 0x3fa78b7s ...

⋮

14: NSString
   NSBytes = "The quick brown fox jumped over the lazy dog"

⋮

42: UILabel
   UIBounds = {0.0, 0.0, 42.0, 21.0}
   UICenter = {334.0, 24.5}
   UIDeepDrawnRect = true
   UIUserInteractionDisabled = true
   UIText = @14
   UIFont = @20
   UITextColor = @40
   UNibEncoderEmptyKey = @28

⋮

53: NSMutableArray
   NSInlinedValue = true
   UINibEncoderEmptyKey = @2
   UINibEncoderEmptyKey = @42

⋮

64: UIView
   UIBounds = {0.0, 0.0, 375.0, 50.0}
   UICenter = {187.5, 85.0}
   UISubviews = @53
   UIHidden = true

FIG. 3

INITIALIZATION FUNCTION 402

```
- (void)viewDidLoad {
    [super viewDidLoad];
    self.titleLabel.text = NSLocalizedString(@"account_success", nil);
    self.centerImageView.image = [UIImage imageNamed:@"success_illustration"];
    self.descriptionLabel.text = NSLocalizedString(@"account_been_verified", nil);
    [self.submitButton setTitle:NSLocalizedString(@"generic_continue", nil) forState:UIControlStateNormal];
    self.browseEventsButton.hidden = NO;
}
```

FIG. 4

```
                        Resource File' 110

0:      NSObject
            UNLibTopLevelObjectsKey = @41
            UNLibObjectsKey = @3
1:      NSString
            NS.bytes = IBFilesOwner
2:      NSImage
            NSInlinedValue = true
            NS.bytes = 0x3fa78b7s ...

•
              •
              •

14:     NSString
            NSBytes = "The quick brown fox jumped over the lazy dog"

•
              •
              •

42:     UILabel
            UIBounds = {0.0, 0.0, 42.0, 21.0}
            UICenter = {334.0, 24.5}
            UIDeepDrawnRect = true
            UIUserInteractionDisabled = true
            UIText = @14
            UIFont = @20
            UITextColor = @40
            UNibEncoderEmptyKey = @28

•
              •
              •

53:     NSMutableArray
            NSInlinedValue = true
            UINibEncoderEmptyKey = @2
            UINibEncoderEmptyKey = @42

•
              •
              •

64:     UIView
            UIBounds = {0.0, 0.0, 375.0, 50.0}
            UICenter = {187.5, 85.0}
            UISubviews = @53
            UIHidden = true
```

FIG. 5

USER INTERFACE RESOURCE FILE OPTIMIZATION

BACKGROUND

Modern software applications can include a large number of features. As a result, such applications can be very large in size, sometimes hundreds of megabytes or even gigabytes. As a result, software applications can consume significant computing resources, such as storage space. Significant network bandwidth can also be consumed when large application programs are transmitted between computing devices, resulting in significant monetary costs. Users might also prioritize large software applications for deletion as compared to smaller applications when storage is limited.

Many techniques have been utilized previously to reduce the size of software applications, including dead code stripping, file compression, and feature removal. However, these techniques are not always applicable or effective. For example, dead code stripping is applied during compilation, and as such does not affect code written in non-compiled (i.e. interpreted) languages. Similarly, code that is compiled "just in time", after being downloaded to a client device, will not reduce the size of the download. Dead code stripping is also limited by relying on code-flow analysis, which does not consider something safe to remove if it is later referenced by the application. File compression is limited in effectiveness by the type of data being compressed, and has the added expense of requiring an expensive decompression step on the client.

However, even if these previous techniques have been applied, users and producers may still benefit from a further reduced software application size. As such, there persists a need to further reduce the size of software application size. It is with respect to these and other considerations that the disclosure made herein is presented.

SUMMARY

Technologies described herein reduce the size of a software application. Generally described, the techniques disclosed herein can reduce the size of an application through an analysis of source code and a resource file that enables the removal of data from the resource file that is determined to be duplicative or unused during runtime. Reducing file size has many technological benefits: memory, processing, and power efficiency are improved. Download size—the number of bytes transferred over a network to distribute the software application to a client device, and install size—the number of bytes used to store the application on the client device, are reduced. End users experience faster download times, faster launch times, and increased responsiveness. Developers attract and retain performance sensitive customers while reducing distribution costs.

In some embodiments, one or more resource files, such as but not limited to an iOS®/macOS® .nib or storyboard, or a Windows® .rc file, are reduced in size. Resource files include key/value pairs that define elements of an application. For example, a resource file may define a size and location of a view, a color of a button, or a weight and style of a font. Often, a resource file is generated by a visual designer, which can be an application program that enables a user interface to be constructed using mouse and keyboard input. An application may have tens, hundreds, or more resource files, such that even small reductions in the size of the resource files may have a large effect on the size of an application.

In some embodiments, an application's source code is analyzed to determine if an entry in a resource file used by the application may be removed. An initialization function in the application's source code may be analyzed to determine if a value loaded from a resource file is replaced before being used. For example, a button with a color property may be defined as grey by a resource, but later set to orange at execution time by an initialization function. In this case, the resource entry defining the button as grey is superfluous and may be safely removed. In this embodiment, entries may be removed from a resource file even though the application's source code contains a reference to the entries.

By applying the techniques discussed herein, real world savings of 50 kb have been observed for a set of already heavily optimized resource files that were collectively 1.5 mb in size. However, greater or lesser savings may be achieved based on the number of resource files included in a given application, the size of those resource files, the frequency of elements with values that were overwritten, etc. This improves on existing techniques that analyze a resource file in isolation, or based on tools that only remove values that are not referenced by the application.

It should be appreciated that the above-described subject matter can be implemented as a computer-controlled apparatus, a computer-implemented method, a computing device, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items.

FIG. 3 illustrates an exemplary resource file before optimization.

FIG. 4 illustrates an exemplary initialization function that is analyzed to determine key/value pairs that can be safely removed from the exemplary resource file.

FIG. 5 illustrates an exemplary resource file that has had superfluous key/value pairs removed.

DETAILED DESCRIPTION

Figure 1:
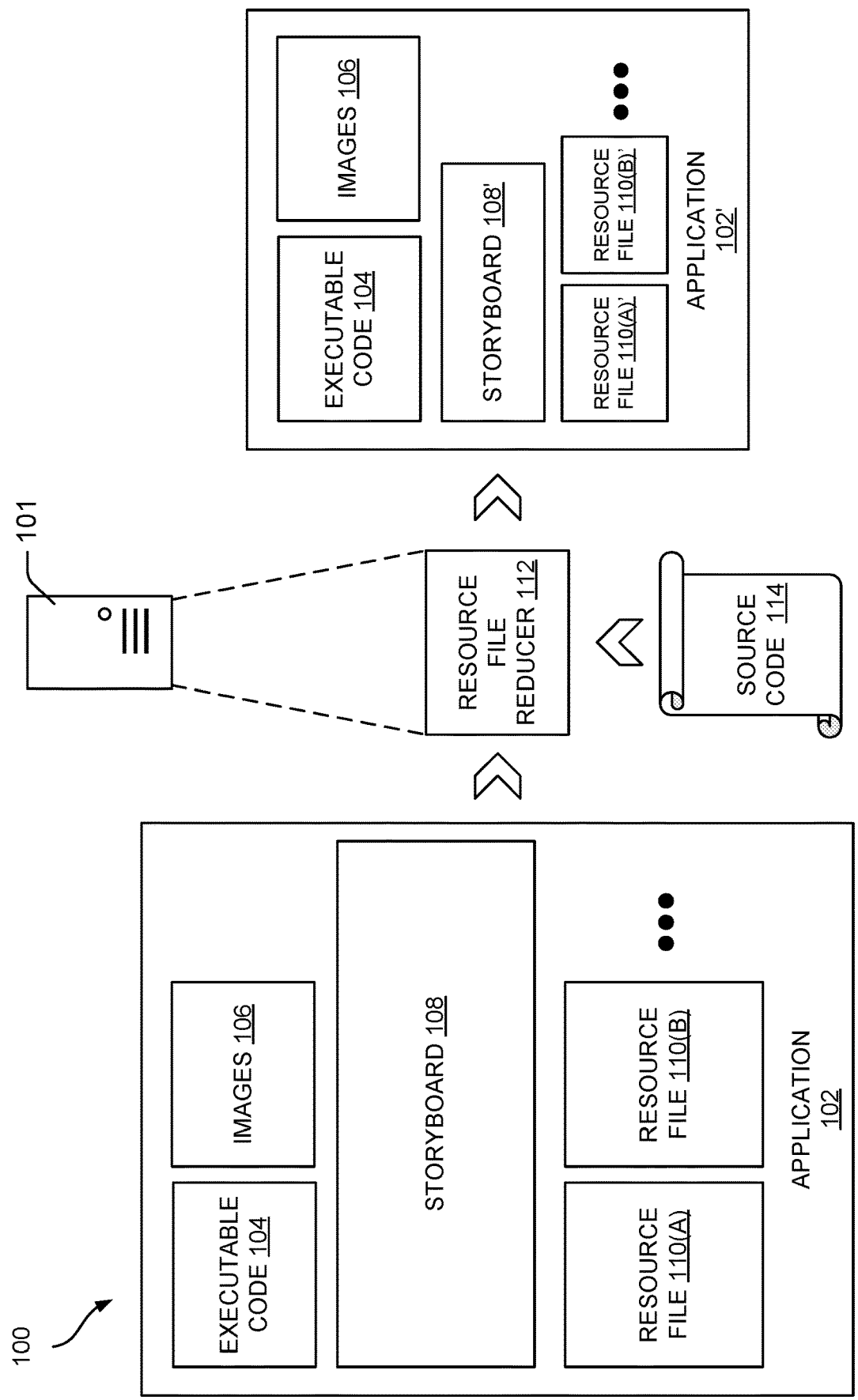
FIG. 1 illustrates an exemplary system for reducing the size of a software application.

The following Detailed Description describes technologies that reduce the size of an application. Technical benefits include improving memory, processing, and power efficiency. Download size, the number of bytes transferred over a network to distribute the software application to a client device, and install size, the number of bytes used to store the application on the client device, are reduced. End users experience faster download times, faster launch times, and increased responsiveness. Developers attract and retain performance sensitive customers while reducing distribution costs.

In common development scenarios, resource files are generated by a developer tool such as Apple® Xcode® or Microsoft® Visual Studio®. For example, Xcode allows a developer to visually define, with keyboard and mouse, the size, location, color, text, and other properties of graphical elements that are part of a user interface. These properties are stored in a resource file, such that at runtime, objects representing the elements may be recreated as they were defined in Xcode. Non-visual elements may also have properties defined in a resource file.

In a resource file, resources are commonly stored as key/value pairs, grouped by element. Elements may be nested, allowing a tree of elements to be defined. For example, a 'UIView' element may include key/value pairs for 'Bounds' (boundaries)={0.0, 0.0, 375.0, 50.0} and 'Center'={187.5, 85.0}. In addition to defining literal values, elements may define 'SubViews', which point to one or more child element that each have their own list of key/value pairs. The 'UIView' element may have child labels, child buttons, or other graphical elements.

In some embodiments, at runtime, the key/value pairs associated with an element are used to instantiate associated runtime objects. In some embodiments, the associations are defined in the resource file as a list of connections—i.e. a list that maps class member variables to elements in the resource file. Based on this mapping, values are copied from the resource file to the corresponding object properties. For example, a resource file may include a textbox element having a text property defined as "the quick brown fox jumps over the lazy dog". In this way, at runtime, the 'Text' property of the corresponding textbox object is set to this string. In some embodiments, this loading process occurs before user-defined initialization functions are executed.

However, once the user defined initialization function is called, the application may overwrite a value that originated in a resource file. This may be done for several reasons: to localize a string, to implement a UI customization (e.g. a 'skin'), because the value stored in the resource file is a default inserted by a developer tool that was never intended for use, or any other reason.

The discussion above describes the context of the claimed techniques for reducing software application size discussed below. If an assignment happens within an initialization function, the value that was loaded from the resource file will be overwritten before it is used by the rest of the application, and so the key/value pair can be safely removed from the resource file. Continuing the example, if, in an initialization function, the developer overwrites the 'Text' property of the textbox object with the string "One fish, two fish, red fish, blue fish", then the string "the quick brown fox jumps over the lazy dog" can safely be removed from the resource file. Then, upon execution, all other properties of the textbox object will be loaded from the resource file, e.g. location, size, etc., but not the text itself. Thus the textbox object will be generated as if "the quick brown fox jumps over the lazy dog" was never added to the resource file in the first place.

Other information stored in a resource file may be similarly optimized. For example, data describing the state of an element, such as whether it is hidden or visible, may be encoded in a resource file. If this state is explicitly set in the initialization function, causing the value from the resource file to be overwritten, then the state value in the resource file may be removed without impacting execution of the application. Similarly, checkbox state may have a default value set by the resource file that is overwritten in the initialization function, allowing the resource value representing this state to be deleted from the resource file. Images, or file path references to images, may be similarly pruned from a resource file if it is determined that they are overwritten in an initialization function.

In one embodiment, when the application targets the iOS® or MacOS® platform, analysis may be performed on an initialization function such as 'ViewDidLoad' or 'AwakeFromNib'. However, any user defined function that executes after initialization from a resource file, but before any other user defined code, is similarly contemplated.

As discussed above, in some embodiments, developer tools generate resource files that include values used at design time but not at run time. These values may be defaults introduced by a design tool, or they may be added by a developer at design time to better visualize what a graphical element will look like at run-time. To a traditional code-flow analysis, these default values are referenced by the application (i.e. the properties populated by the default values are referenced by the application), and so previous techniques for identifying unused values would not recognize these replaced values as superfluous.

Turning now to FIG. 1, illustrated is an exemplary system 100 for reducing the size of a software application 102. As illustrated, the system 100 may include computing device 101 implementing resource file reducer 112. Resource file reducer 112, in some embodiments, is a software component that analyzes source code 114 of an application 102 in order to identify ways to remove entries from storyboard 108 and/or resource files 110(a), 110(b), etc. The resulting storyboards and resource files are represented by storyboard 108' and resource files 110(a)', 110(b)', etc. In this way, application 102, which has already been compiled at least in part from source code 114, is reduced in size. The reduced size version of the application 102 is represented in FIG. 1 by application 102'. While applying the transformation, executable code 104 and images 106, among other file types included in the application, remain unchanged.

Figure 2:
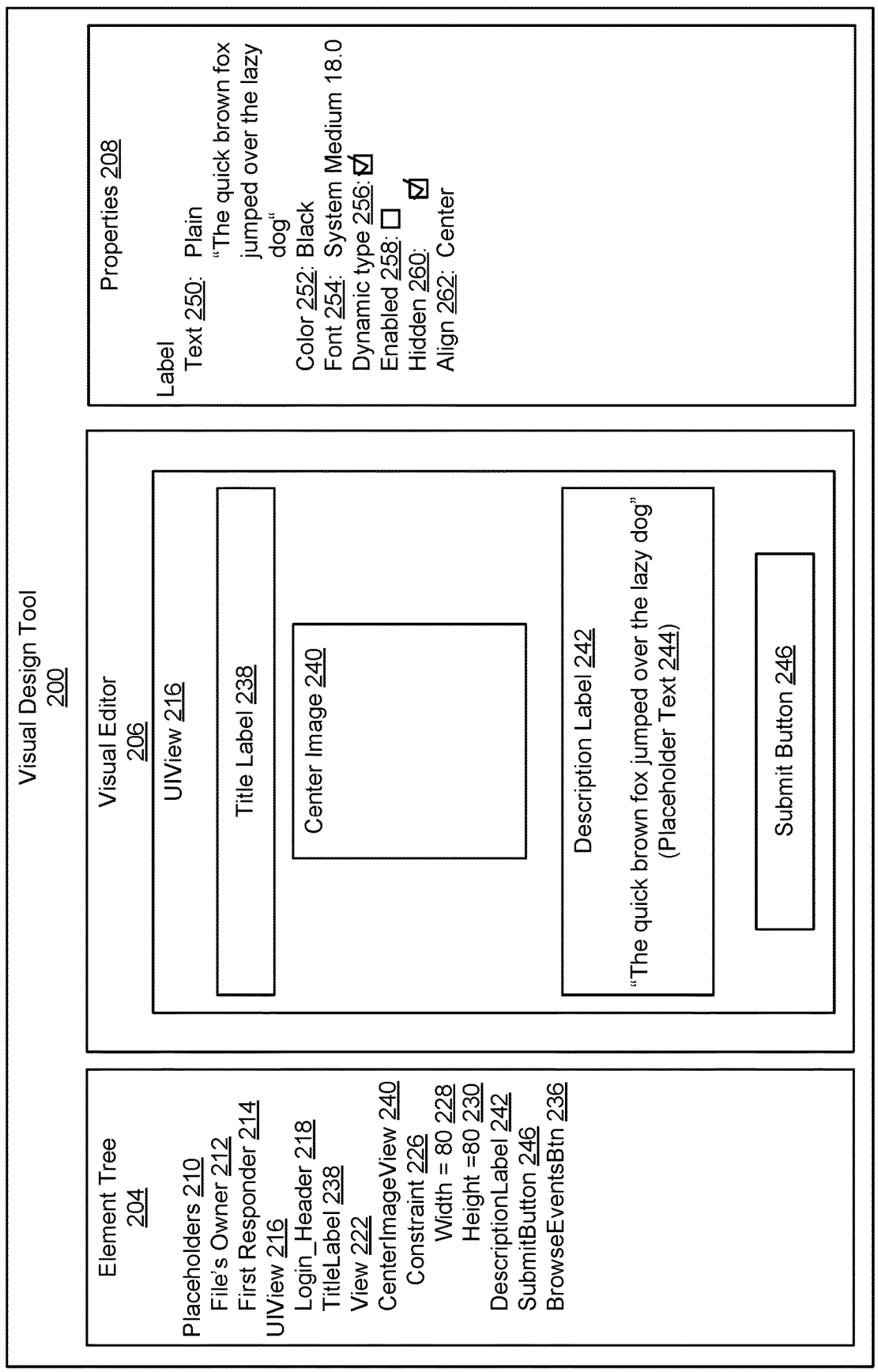
FIG. 2 illustrates an exemplary visual design tool used to generate resource files for graphical user interfaces.

Turning now to FIG. 2, illustrated is exemplary visual design tool 200 used to generate resource files that are optimized by the disclosed embodiments. Visual design tool 200 may be used by a software developer to design graphical user interfaces visually, e.g. by dragging and dropping components such as UI View 216, title label 238, center image 240, description label 242, and submit button 246 onto a canvas. A developer may then move, resize, delete, or otherwise edit the graphical elements. For example, a developer may edit properties 208 of a selected graphical element.

As depicted, the properties of description label 242 are being edited, such as text 250, color 252, font 254, dynamic type 256, enabled state 258, hidden state 260, and alignment 262. State, such as Boolean values enabled 258 and hidden 260, may be indicated with a check-box. For each graphical element, location, size, and other properties are derived from the position of the graphical elements within visual editor 206 and stored in a corresponding resource file 110 as key/value pairs. Similarly, properties listed in properties window 208 are stored in the corresponding resource file 110 as key/value pairs.

In some embodiments, element tree 204 depicts a hierarchy of graphical elements as they have been laid out by a developer. This hierarchy is reflected in the generated resource file 110. As depicted, graphical element UIView 216 is a parent element, representing the top-level graphical element depicted in visual editor 206. Child elements include Login_Header 218, TitleLabel 238, View 222, CenterImageView 240, DescriptionLabel 242, SubmitButton 246, and BrowseEventsButton 236. CenterImageView 240 itself has child graphical elements, including Constraint 226, which includes width 80 (pixels) 228 and height 80 230.

Turning now to FIG. 3, illustrated is an exemplary resource file 110. Resource file 110 includes a series of key/value pairs that are grouped by elements. Throughout this disclosure, the terms "properties", "entries", and "key/value pairs" are used interchangeably when referring to a resource file. Each element is numbered and has a name (e.g. "0: NSObject"). In the depiction illustrated in FIG. 3, the key/value pair is displayed in the form "<Key>=<Value>", where the Key is a name and the Value may be data or a reference to another element. However, resource files may be encoded in any number of ways, often in a compressed or encoded binary format.

Resource file 110 depicts a resource file as generated by a compiler, but before the optimizations described herein have been applied. For example, element 42, "UILabel", has the key/value pair "UIBounds={0.0, 0.0, 42.0, 21.0}. This property represents the boundary of the UILabel graphical element, and is an example of a data literal stored in the resource file. At the same time, the "UIText" Key under entry 42 ("UILabel") has a Value of "@14", where the '@' sign indicates that "14" refers to element 14 of the resource file (i.e. "14 NSString").

Turning now to FIG. 4, illustrated is an exemplary initialization function 402. Initialization function 402 represents user-generated code (as opposed to code generated by a tool, such as visual design tool 200). In some embodiments, initialization function 402 is executed for a graphical element in response to loading values from the element's resource file 110. By nature of being executed before any other user generated code, any values overwritten during initialization function 402 are superfluous, and may be safely deleted from resource file 102.

For example, "self.descriptionlabel.text" is a property on the "descriptionlabel" element included in the view being loaded. The value of this property has already been set to a value retrieved from resource file 102, e.g. "the quick brown fox jumped over the lazy dog". However, by determining that this property of the "descriptionlabel" element is being overwritten in the initialization function, resource file reducer 112 may conclude that the entry containing "the quick brown fox . . . " can be removed.

A similar analysis can be performed on other types of information stored in the resource file. For example, "self.browserEventsButton.hidden=NO" sets the hidden property of the browserEventsButton to no. As this assignment is happening in code in initialization function 402, there is no use for a value stored in the resource file, whether or not the value in the resource file is different from the value set in initialization function 402.

Turning now to FIG. 5, illustrated is an exemplary resource file 110 that has had superfluous key/value pairs removed. Resource file 110 details how a resource file may be modified by resource file reducer 112. Entries that have been removed are depicted with strikethroughs for sake of clarity, but as actually implemented the entries would be completely removed from the resource file. For example, the descriptionLabel 242 corresponds to element 42 in the resource file, which points to the string "The quick brown fox jumped over the lazy dog" via entry 14. However, based on this information, the line of code "self.descriptionLabel.text=NSLocalizedString(@"account has been verified", nil);" depicted in FIG. 4 may be analyzed to determine that the "descipriptionLabel.text" property is overwritten. As discussed above, the purpose of overwriting the value is inconsequential.

Resource file 110 also depicts other types of key/value pairs being deleted. For example, entry 64 has the property "UIHidden=true", which was set based on the checkbox next to the Hidden state 260 as indicated in FIG. 2. However, the line "self.browserEventsButton.hidden=NO;" of initialization function 402 overwrites this value, allowing it to be safely removed from resource file 110. Similarly, the deletion of the element 2 (NSImage) is enabled by the line "self.centerImageView.image=[UIImage imageNamed: @"success_illustration"];", which overwrites the value of the image in the initialization function. Resource file 110 also depicts the deletion of the placeholder "Filesowner", as depicted by the strikethrough of element 1.

FIGS. 6-9 illustrate example processes 600, 700, 800, and 900 for reducing the size of a software application 102. The processes are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform or implement particular functions. The order in which operations are described is not intended to be construed as a limitation, and any number of the described blocks can be combined in any order and/or in parallel to implement the process. Other processes described throughout this disclosure shall be interpreted accordingly.

Figure 6:
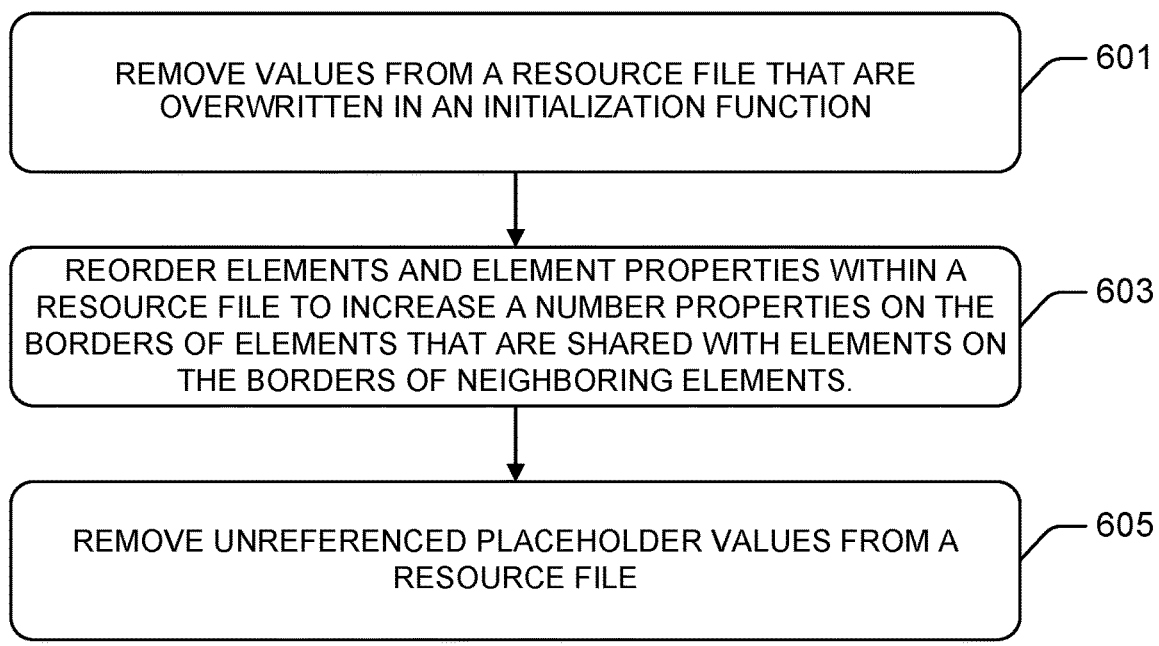
FIG. 6 illustrates an overview of exemplary processes for reducing the size of a software application.

FIG. 6 illustrates an overview of exemplary processes 600 for reducing the size of a software application 102 as described above with regard to FIGS. 1-5. In some embodiments, exemplary process 600 is implemented by computing device 101. While FIG. 6 describes an overview of a number of techniques for reducing software application size, any technique, or combination of techniques may be independently applied, and in any order. For example, block 601 describes a technique for removing values from a resource file that are overwritten in an initialization function. This technique may be applied alone or in combination with the techniques described in blocks 603 and 605.

Block 601, discussed in more detail below in conjunction with FIG. 7, describes a technique for removing values from a resource file that are overwritten in an initialization function. Block 603, discussed in more detail below in conjunction with FIG. 8, describes reordering elements and element properties within a resource file to increase a number of properties on the borders of elements that are also on the borders of neighboring elements. Block 605, discussed in more detail below in conjunction with FIG. 9, describes removing unreferenced placeholder values from a resource file.

Figure 7:
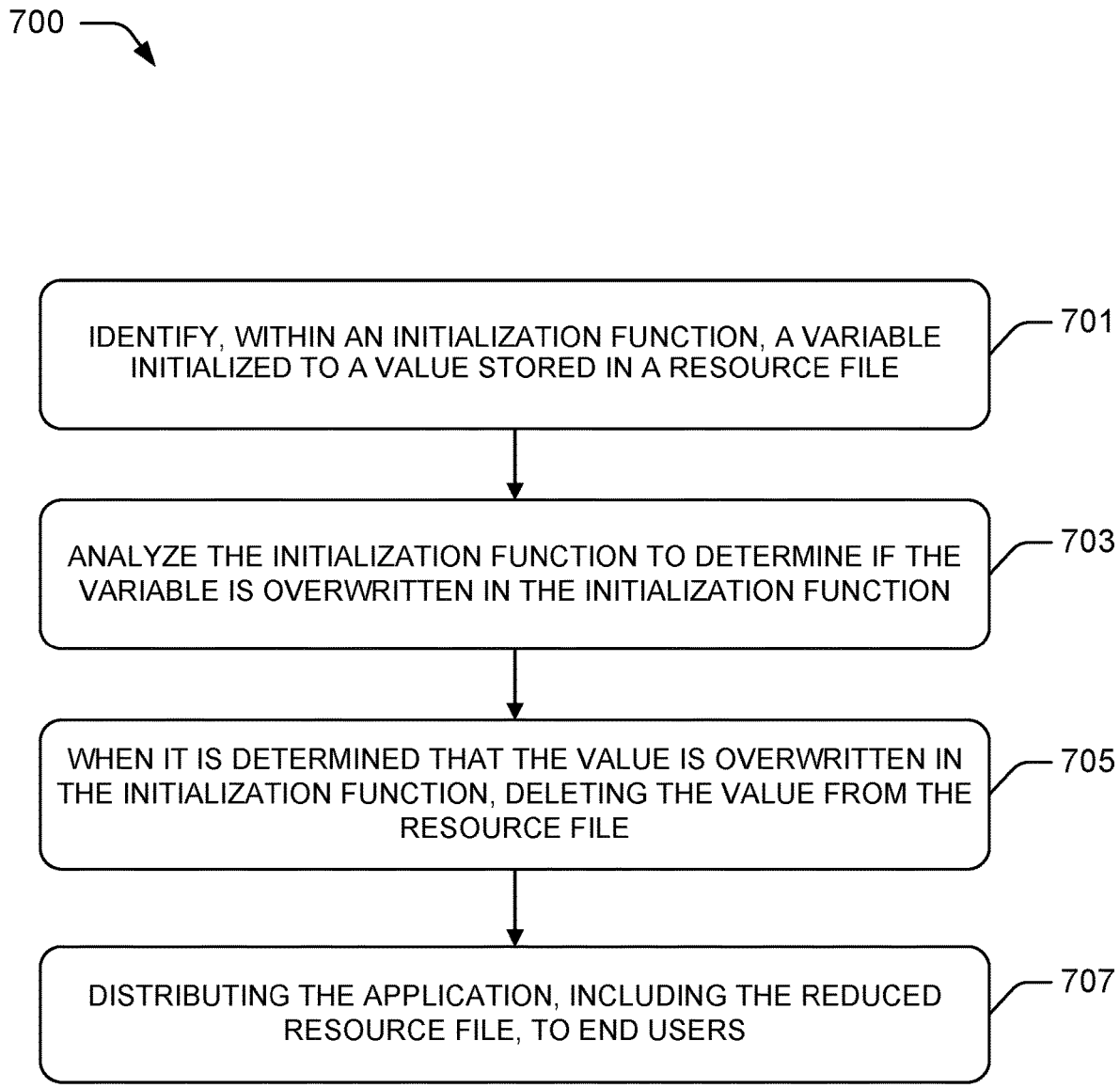
FIG. 7 illustrates an example process of reducing the size of a software application by removing values from a resource file that are overwritten in an initialization function.

FIG. 7 illustrates an example process 700 of reducing the size of a software application 102 by removing values from a resource file that are overwritten in an initialization function. At block 701, a system may identify, within an initialization function, a variable initialized to a value stored in a resource file. The variable may be a member variable (i.e. field, property, etc.) of a run-time object associated with a graphical element. In some embodiments, the association between the variable and the value stored in the resource file is based on a list of connections stored in the resource file that map graphical elements designed by a visual designer onto runtime objects described in code.

For example, Title Label 238, a label element, may have a "Font" property that describes the font, e.g. Arial, Times New Roman, etc., used by the label. An associated runtime object, e.g. "titleLabel", may have a corresponding ".font" property. A correspondence between the "Font" property in the resource file and the ".font" property on the corresponding runtime object may be based on a text comparison. When such a correspondence exists, it is determined that the "Font" property of the resource file has been used to initialize the "titleLabel.font" property of the runtime object.

At block 703, the system analyzes the initialization function 402 to determine if the variable (e.g. member variable "titleLabel.font") is overwritten. Assignment statements may appear in many ways, such as with an overloaded '=' operator, a copy function, or the like. Assignment statements may be identified based on an abstract syntax tree of the initialization function, based on a text comparison, or the like.

The source of the value assigned to the "titleLabel.font" property is immaterial. The value overwriting the identified variable may be a constant, loaded from a table, or generated dynamically based on other values in the resource file. Also, the data type of the value is immaterial—strings, numbers, and complex data types are similarly contemplated.

At block 705, when it is determined that the value is overwritten in the initialization function, the value is deleted from the resource file. In one embodiment, the value is deleted from the resource file by reading the resource file into memory, removing key/value pairs associated with the identified variable, and writing out a new modified copy of the resource file. However, the original resource file may also be edited in place.

In some embodiments, the key/value pair associated with the identified variable is removed. However, the resource file may be scanned to locate any references (i.e. "@xxx" values) that point to the key/value pair, and delete these as well. Then, at block 707, the application, with the modified resource file is distributed to end users for execution.

Entries may be safely removed from a resource file based on other criteria. For example, an abstract syntax tree may be created from the source code used to compile the application, and a code-flow analysis applied to determine if a value loaded from a resource file is ever used. This analysis may determine if the value is overwritten outside of designated initialization functions, or if the value is simply unreferenced.

In other embodiments, values associated with orphaned User Interface (UI) elements may be identified and removed. Orphaned UI elements may be introduced accidentally, e.g. left behind after implementing "AB testing". AB testing inserts different versions of a user interface into an application for evaluation by actual end users. Once, based on end user data, a preferred user interface is identified, the remaining UI elements are intended to be removed, but may remain in the application unintentionally. In these cases, a code-flow analysis may determine that a particular value is never used, and so the corresponding entries may be removed from the resource file.

Figure 8:
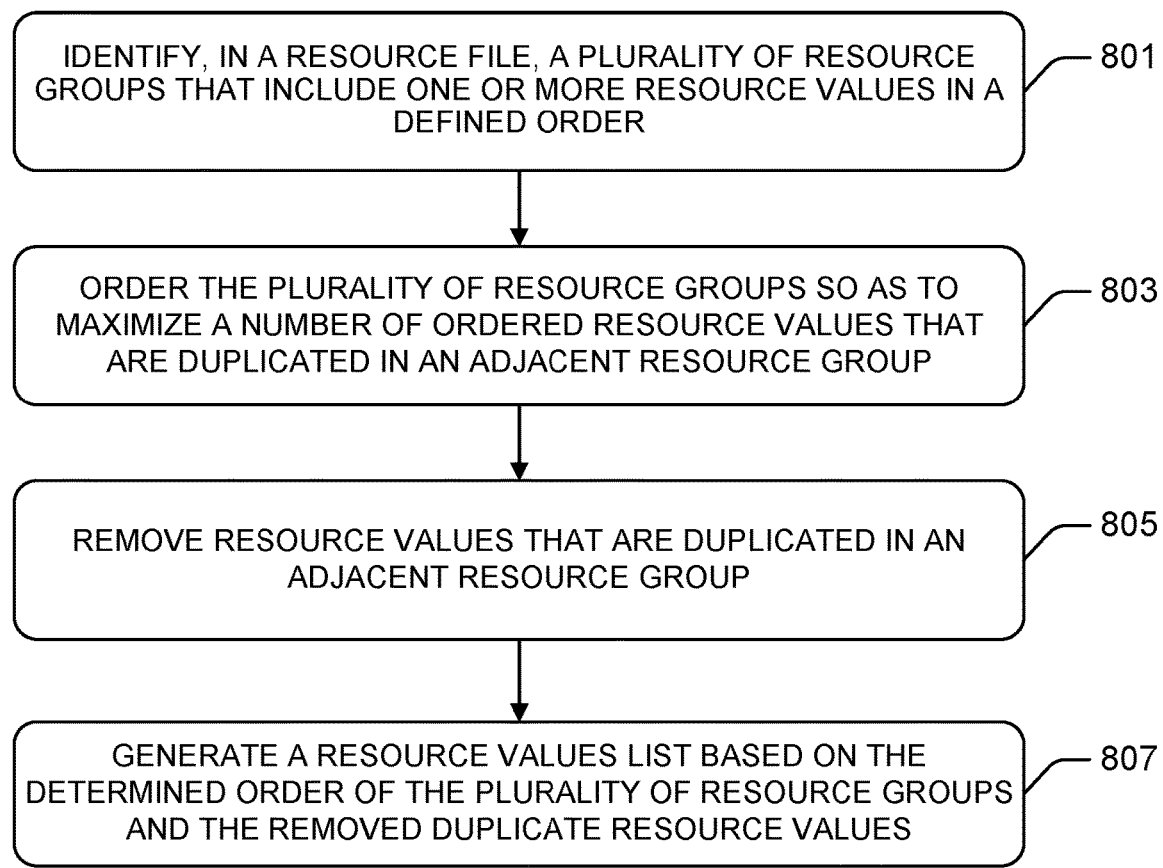
FIG. 8 illustrates an example process of reducing the size of a software application by reordering elements and properties of elements to maximize property overlap between adjacent elements.

FIG. 8 illustrates an example process 800 of reducing the size of a software application 102 by reordering elements and properties of elements to increase a number of properties on the borders of elements that are in common with elements on the border of neighboring elements. At block 801, a plurality of resource groups that include one or more resource values in a defined order are identified within a resource file. Resource groups may comprise elements, such as views, buttons, labels, and the like, but any collection of resource values are similarly contemplated. Similarly, resource values may comprise properties, such as key/value pairs (e.g. Bounds="{0.0, 0.0, 50.0, 80.0}", Activated="true", and the like), but other values are similarly contemplated.

In some embodiments, the order of resource values (e.g. key/value pairs) in a resource collection (e.g. an element) does not impact runtime behavior, in which case the resource values may be re-ordered before or after the resource file has been generated. Similarly, in some embodiments, the order of resource groups in a resource file does not impact runtime behavior, and as such may be re-ordered before or after the resource file has been generated.

At block 803, the plurality of resource groups are ordered so as to maximize a number of ordered resource values that are duplicated in an adjacent resource group. This allows adjacent groups to include the same instance of the duplicated resource values, allowing one of the two copies of the duplicated resource values to be deleted from the resource file. In some embodiments, a resource file lists resource values in a single global list, and defines elements with a pointer to the global resource values list and a number of (i.e. count of) resource values to be included.

For example, if there are three elements in a resource file, the first having the resource values A, B, C, and D (in that order), the second having Y and Z, and the third having C, D, E, the elements may be re-ordered so that the first and third elements are adjacent. Moreover, the elements are re-ordered such that the resource values in common (C and D) are adjacent—i.e. the final order is (first), (third), (second), not (third), (first), (second).

This optimization may be applied to any number of elements in the resource file. In some embodiments, different orderings produce different amounts of resource value overlap, and so some or all of the permutations may be tried to maximize the total amount of overlap.

In some embodiments, an element may completely overlap with one or both neighbors, such that all constituent resource values are shared with one or both adjacent neighbors. In some embodiments, duplicate values may span more than a single neighbor in the same direction. For example, instead of a third element having C, D, E, if the third element had resource value C while a fourth element had resource values D, E, then a final arrangement of elements could be (first), (third), (fourth), (second), to allow the resource values C and D from the first element to overlap with the C from the (third) and the D from the (fourth) elements.

In addition to re-ordering elements, resource values within elements may be re-ordered to maximize the number of duplicate values along adjacent elements. For example, a label element may have properties such as "Bounds"={0.0, 0.0, 0.0, 0.0}, "Center"={0.0, 0.0}, "Text"="foobar", "Font"="Arial", and "TextColor"="Red", among others, while a button element may have properties such as "Bounds"={0.0, 0.0, 50.0, 80.0}, "Center"={0.0, 0.0}, "Text"="Ok", "Font"="Arial", and "TextColor"="Blue". In this example, two of the five properties share a name and a value, "Center" and "Font". To facilitate overlap between the label and the button, and because properties may be arranged in any order, the label element may use the order "Bounds", "Text", "TextColor", "Center", "Font", while the button may use the order "Font", "Center", "Bounds", "Text", "TextColor". In this way, the "Center" and "Font" properties are on the right side of the label element and the left side of the adjacent button element. Note that, because order of resource values does not matter, the button may also have been ordered "Center", "Font", "Bounds", "Text", "TextColor" with equivalent results. In this scenario, the resource file may be edited such that the label element and the button element point to the same "Center" and "Font" properties.

At block 805, resource values that are duplicated in an adjacent resource group are removed. In some embodiments, the duplicated resource values are removed by generating a new global list of resource values without the duplicate entries.

At block 807, a resource value list based on the determined order of the plurality of resource groups is generated. In some embodiments, a resource file is generated that includes the new ordering of resource groups, with some or all of the resource groups defined by the new global list of resource values.

Figure 9:
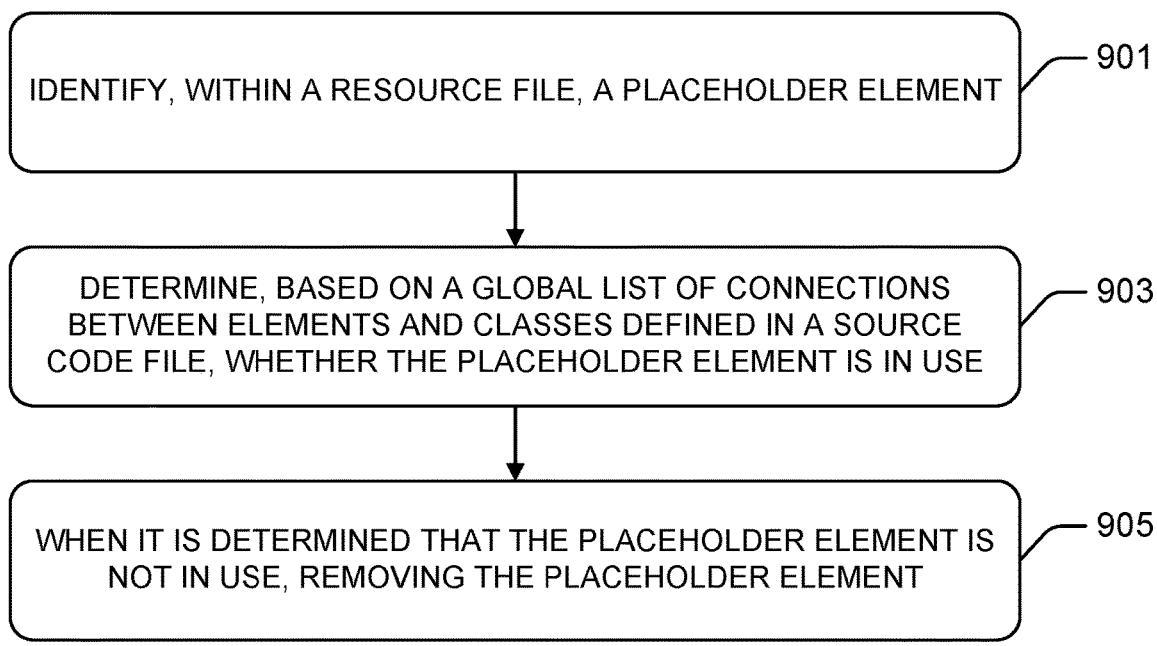
FIG. 9 illustrates an example process of reducing the size of a software application by removing unreferenced placeholder values from a resource file.

FIG. 9 illustrates an example process 900 of reducing the size of a software application 102 by removing unreferenced placeholder values from a resource file.

At block 901, a placeholder element is identified within a resource file. Resource files may include placeholder values that are not themselves resources, but server as placeholders for one or more resources. For example, file's owner and first responder placeholders appear in all .nib files. They establish connections between a view (a canvas that contains graphical elements such as buttons, labels, etc.) and a class name referenced in source code. This is one way in which the application's source code can reference properties in the resource file. However, there are other ways for source code to reference a property in a resource file, such that particular placeholder elements take up space without providing a useful function.

At block 903, a determination is made whether a placeholder value is being used. In some embodiments, a determination is made that the placeholder value is not in use by searching a global list of connections included in the resource file. If any connections have the placeholder as the source or destination of the connection, then the data identifying the file's owner cannot be removed. Otherwise, the placeholder may be deleted from the resource file. In some embodiments, removing placeholder entries from the resource file is performed post-compilation, to avoid rules enforced by the compiler that require the placeholder values.

At block 905, when it is determined that the placeholder element is not in use, the placeholder element is removed from the resource file.

Figure 10:
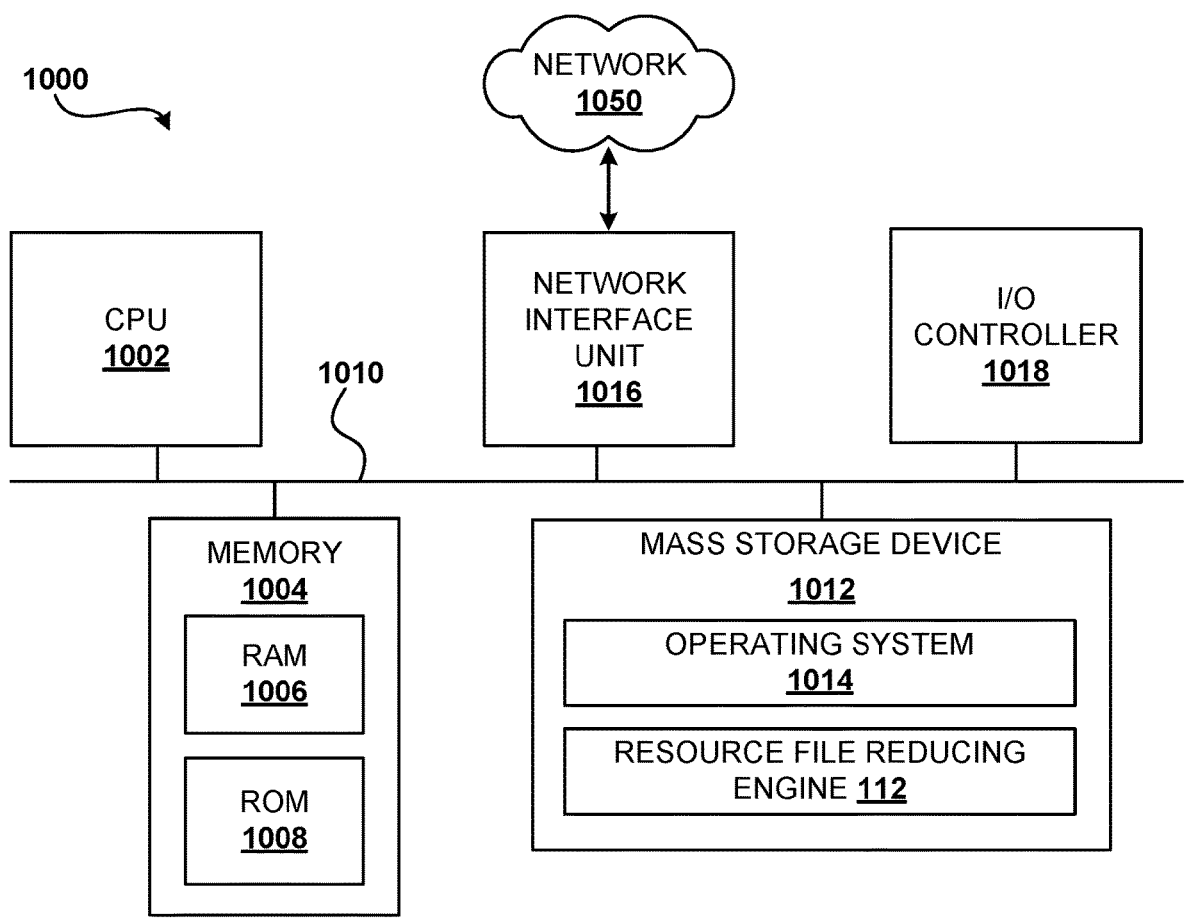
FIG. 10 shows additional details of an example computer architecture for a computer capable of executing the software components described herein.

FIG. 10 shows additional details of an example computer architecture for a computer capable of providing the functionality described herein such as, for example, that described with reference to the resource file reducing engine 112, or any program components thereof as described herein. Thus, the computer architecture 1000 illustrated in FIG. 10 illustrates an architecture for a server computer, or network of server computers, or any other types of computing devices suitable for implementing the functionality described herein. The computer architecture 1000 may be utilized to execute any aspects of the software components presented herein.

The computer architecture 1000 illustrated in FIG. 10 includes a central processing unit 1002 ("CPU"), a system memory 1004, including a random-access memory 1006 ("RAM") and a read-only memory ("ROM") 1008, and a system bus 1010 that couples the memory 1004 to the CPU 1002. A basic input/output system containing the basic routines that help to transfer information between elements within the computer architecture 1000, such as during startup, is stored in the ROM 1008. The computer architecture 1000 further includes a mass storage device 1012 for storing an operating system 1014, other data, and one or more application programs. The mass storage device 1012 may further include the resource file reducing engine 112.

The mass storage device 1012 is connected to the CPU 1002 through a mass storage controller (not shown) connected to the bus 1010. The mass storage device 1012 and its associated computer-readable media provide non-volatile storage for the computer architecture 1000. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 1000.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 1000. For purposes of the claims, the phrase "computer storage medium," "computer-readable storage medium" and variations thereof, does not include waves, signals, and/or other transitory and/or intangible communication media, per se.

According to various techniques, the computer architecture 1000 may operate in a networked environment using logical connections to remote computers through a network 1050 and/or another network (not shown). The computer architecture 1000 may connect to the network 1050 through a network interface unit 1016 connected to the bus 1010. It should be appreciated that the network interface unit 1016 also may be utilized to connect to other types of networks and remote computer systems. The computer architecture 1000 also may include an input/output controller 1018 for receiving and processing input from a number of other devices, including a keyboard, mouse, or electronic stylus (not shown in FIG. 10). Similarly, the input/output controller 1018 may provide output to a display screen, a printer, or other type of output device (also not shown in FIG. 10). It should also be appreciated that via a connection to the network 1050 through a network interface unit 1016, the computing architecture may enable the product of the resource file reducing engine 112 to be distributed to customers.

It should be appreciated that the software components described herein may, when loaded into the CPU 1002 and executed, transform the CPU 1002 and the overall computer architecture 1000 from a general-purpose computing system into a special-purpose computing system customized to facilitate the functionality presented herein. The CPU 1002 may be constructed from any number of transistors or other discrete circuit elements, which may individually or collectively assume any number of states. More specifically, the CPU 1002 may operate as a finite-state machine, in response to executable instructions contained within the software modules disclosed herein. These computer-executable instructions may transform the CPU 1002 by specifying how the CPU 1002 transitions between states, thereby transforming the transistors or other discrete hardware elements constituting the CPU 1002.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 1000 in order to store and execute the software components presented herein. It also should be appreciated that the computer architecture 1000 may include other types of computing devices, including hand-held computers, embedded computer systems, personal digital assistants, and other types of computing devices known to those skilled in the art. It is also contemplated that the computer architecture 1000 may not include all of the components shown in FIG. 10, may include other components that are not explicitly shown in FIG. 10, or may utilize an architecture completely different than that shown in FIG. 10.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A computer-implemented method of optimizing an application, comprising:
    identifying, within a source code of the application, a reference to a first resource value retrieved from a resource file;
    analyzing the source code to determine whether, at run-time, the first resource value will be overwritten by the application with a second resource value before the first resource value is used by the application; and
    when it is determined that the first resource value will be overwritten with the second resource value before the first resource value is used by the application, deleting the first resource value from the resource file.

2. The computer-implemented method of claim 1, wherein determining whether the first resource value will be overwritten by the application at run-time includes analyzing an initialization function of the application to determine whether the first resource value is overwritten with the second resource value in the initialization function.

3. The computer-implemented method of claim 1, wherein determining whether the first resource value will be overwritten by the application at run-time is based on analyzing the source code to identify a run-time object having a reference to the first resource value, and determining whether a property of the run-time object that was initialized to the first resource value will be overwritten before the property is used.

4. The computer-implemented method of claim 3, wherein the run-time object comprises a visual element, and wherein using first the resource value comprises displaying the visual element in part based on the first resource value.

5. The computer-implemented method of claim 1, wherein the first resource value comprises a string, an image, an icon, a font, a text color, a background color, positioning information, or accessibility descriptors.

6. The computer-implemented method of claim 1, wherein the identifying, analyzing, and deleting is performed before the application is distributed.

7. The computer-implemented method of claim 1, wherein analyzing the source code includes analyzing an initialization function comprising user-define code that executes after the first resource value is loaded from the resource file but before any other user-define code is executed.

8. The computer-implemented method of claim 1, wherein the resource file comprises a plurality of key-value pairs, wherein the resource value comprises a value of one of the plurality of key-value pairs, and wherein the reference to the resource comprises a key of the one of the plurality of key-value pairs.

9. The computer-implemented method of claim 8, wherein deleting the reference from the resource file comprises deleting the one of the plurality of key-value pairs from the resource file.

10. The computer-implemented method of claim 1, wherein the source code is analyzed before the application is executed.

11. A system comprising:
one or more processing units; and
a computer-readable medium having encoded thereon computer-executable instructions to cause the one or more processing units to:
identify a plurality of resource groups that are listed in a first order in a first resource file, wherein a resource group includes one or more resource values in a defined order;
determine a second order of the plurality of resource groups, the second order listing the plurality of resource groups so as to maximize a number of resource values that are duplicated between adjacent resource groups in the listed second order;
remove at least one duplicated resource value from at least one resource group of a pair of adjacent resource groups in the listed second order; and
generate a second resource file comprising the plurality of resource groups in the second order.

12. The system of claim 11, wherein at least one resource value is duplicated in a next adjacent resource group if the at least one resource value occurs in a prior adjacent resource group of the adjacent resource groups in the listed second order.

13. The system of claim 11, wherein the at least one resource value is duplicated in the prior adjacent resource group if the at least one resource value occurs in the next adjacent resource group of the adjacent resource groups in the listed second order.

14. A computer-implemented method of optimizing an application, comprising:
identifying, within an initialization function, a variable that was set to a value retrieved from a resource file, wherein the initialization function is part of a source code listing used to compile the application;
analyzing the initialization function to determine whether the value will be used by the application at run-time based on whether the variable is overwritten in the initialization function; and
when it is determined that the value will not be used by the application at run-time, deleting the value from the resource file.

15. The computer-implemented method of claim 14, wherein the variable comprises a property of a graphical element, and wherein the graphical element was designed using a visual designer developer tool.

16. The computer-implemented method of claim 14, wherein the value was stored in the resource file by the visual designer developer tool based on a value supplied by a developer of the graphical element or based on a default value.

17. The computer-implemented method of claim 14, wherein the value comprises a text string, an embedded image, a reference to an image, or a property of an object.

18. The computer-implemented method of claim 14, further comprising:
determining whether the resource file includes connections between a user supplied programming object and graphical elements defined in the resource file; and
when it is determined that the resource file does not include connections between a user supplied programming object and graphical elements defined in the resource file, removing a placeholder entry from the resource file that links user supplied programming objects with graphical elements defined in the resource file.

19. The computer-implemented method of claim 14, wherein the placeholder entry comprises a FilesOwner or a FirstResponder entry.

20. The computer-implemented method of claim 14, further comprising distributing the application with the modified resource file for use by end-users.

\* \* \* \* \*